US008887171B2

(12) United States Patent
Song et al.

(10) Patent No.: US 8,887,171 B2
(45) Date of Patent: Nov. 11, 2014

(54) MECHANISMS TO AVOID INEFFICIENT CORE HOPPING AND PROVIDE HARDWARE ASSISTED LOW-POWER STATE SELECTION

(75) Inventors: Justin J. Song, Olympia, WA (US); John H. Crawford, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 899 days.

(21) Appl. No.: 12/647,671

(22) Filed: Dec. 28, 2009

(65) Prior Publication Data
US 2011/0161627 A1 Jun. 30, 2011

(51) Int. Cl.
G06F 9/46 (2006.01)
G06F 9/50 (2006.01)
G06F 1/32 (2006.01)

(52) U.S. Cl.
CPC .................. *G06F 1/3203* (2013.01); *G06F 9/5094* (2013.01)
USPC .......................... 718/105; 718/104

(58) Field of Classification Search
None
See application file for complete search history.

(56) References Cited

U.S. PATENT DOCUMENTS 7,924,925 B2 * 4/2011 He .......................... 375/240.24
2009/0083551 A1 * 3/2009 Finkelstein et al. ......... 713/300

OTHER PUBLICATIONS

R. Ayoub, T. Simunic Rosing, "Predict and Act: Dynamic Thermal Management for Multicore Processors," ISLPED 2009.
A. Coskun, T. Simunic Rosing, "Utilizing Predictors for Efficient Thermal Management in Multiprocessor SoCs," To appear in IEEE TCAD, 2009.

* cited by examiner

*Primary Examiner* — Meng An
*Assistant Examiner* — Wissam Rashid
(74) *Attorney, Agent, or Firm* — Blakely, Sokoloff, Taylor & Zafman LLP

(57) ABSTRACT

An apparatus and method is described herein for avoiding inefficient core hopping and providing hardware assisted power state selection. Future idle-activity of cores is predicted. If the residency of activity patterns for efficient core hop scenarios is predicted to be large enough, a core is determined to be efficient and allowed. However, if efficient activity patterns are not predicted to be resident for long enough—inefficient patterns are instead predicted to be resident for longer—then a core hop request is denied. As a result, designers may implement a policy for avoiding core hops that weighs the potential gain of the core hop, such as alleviation of a core hop condition, against a penalty for performing the core hop, such as a temporal penalty for the core hop. Separately, idle durations associated with hardware power states for cores may be predicted in hardware. Furthermore, accuracy of the idle duration prediction is determined. Upon receipt of a request for a core to enter a power state, a power management unit may select either the hardware predicted power state, if the accuracy is high enough, or utilize the requested power state, if the accuracy of the hardware prediction is not high enough.

13 Claims, 9 Drawing Sheets

US 8,887,171 B2

MECHANISMS TO AVOID INEFFICIENT CORE HOPPING AND PROVIDE HARDWARE ASSISTED LOW-POWER STATE SELECTION

FIELD

This invention relates to the field of processor execution and, in particular, to optimizing processor operation.

BACKGROUND

Advances in semi-conductor processing and logic design have permitted an increase in the amount of logic that may be present on integrated circuit devices. As a result, computer system configurations have evolved from a single or multiple integrated circuits in a system to multiple processor dice, multiple cores, multiple hardware threads, and multiple logical processors present on individual integrated circuits. A processor or integrated circuit typically comprises a single physical processor die, where the processor die may include any number of cores, hardware threads, or logical processors.

The ever increasing number of processing elements—cores, hardware threads, and logical processors—on integrated circuits enables more tasks to be accomplished in parallel. However, as a corollary to the increased processing power, the problems with thermal density and leakage power are also amplified. As a result, processors with multiple cores may employ a heat dissipation technique called core hopping—moving of at least one core's architecture state/context to another core. However, inherent with moving entire context from one core to another is the cost—wasted execution cycles, energy spent on the move, and cold caches. Yet, currently there is no intelligent decision on when to core hop outside of the initial core hop decision based on thermal density. As a result, a core hop may be initiated when a core hop is not needed—a triggering, thermal-density condition may be self-alleviating—or may be infeasible—the hop results in the same or worse thermal conditions. As a consequence, there are some circumstances where a core hop is triggered due to thermal conditions, but it's advantageous to avoid the core hop.

As the heat and power concerns for processors continue to escalate, the intelligent use of low power states becomes more important. Currently, today's privileged level software—Operating Systems—are not extremely accurate in requesting transition to low power states. As a result, previous software may request a core to enter a specific low power state that is inefficient either from being too deep—lower power consumed but not sufficient wake time in comparison to the amount of time the core is going to be idle in the future—or to shallow—more power consumed when the amount of idle time is greater than the wake time.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware structures/mechanisms for idle-activity prediction, idle duration measurement, accuracy determination; specific processor configurations, specific core hop conditions, specific low power states, specific processor units/logic, specific examples of processing elements etc. in order to provide a thorough understanding of the present invention. It will be apparent, however, to one skilled in the art that these specific details need not be employed to practice the present invention. In other instances, well known components or methods, such as specific and alternative multi-core and multi-threaded processor architectures, specific logic circuits for illustrated modules/blocks, and specific operational details of microprocessors, have not been described in detail in order to avoid unnecessarily obscuring the present invention.

The method and apparatus described herein are for avoiding inefficient core hopping and providing hardware assisted low-power state selection in a processor. Specifically, these optimizations are primarily discussed in reference to hopping and power state selection based on predicted, future activity, or inactivity, of cores in a processor. In fact, an illustrative ring organization for communication between processor cores is briefly described below in reference to FIG. 2 to illustrate an embodiment of a potential on-processor core configuration. Yet, the apparatus' and methods described herein are not so limited, as they may be implemented in any integrated circuit utilizing context hopping or power state selection for separate portions of the integrated circuit.

Embodiments of Multi-Core Processors

Figure 1:
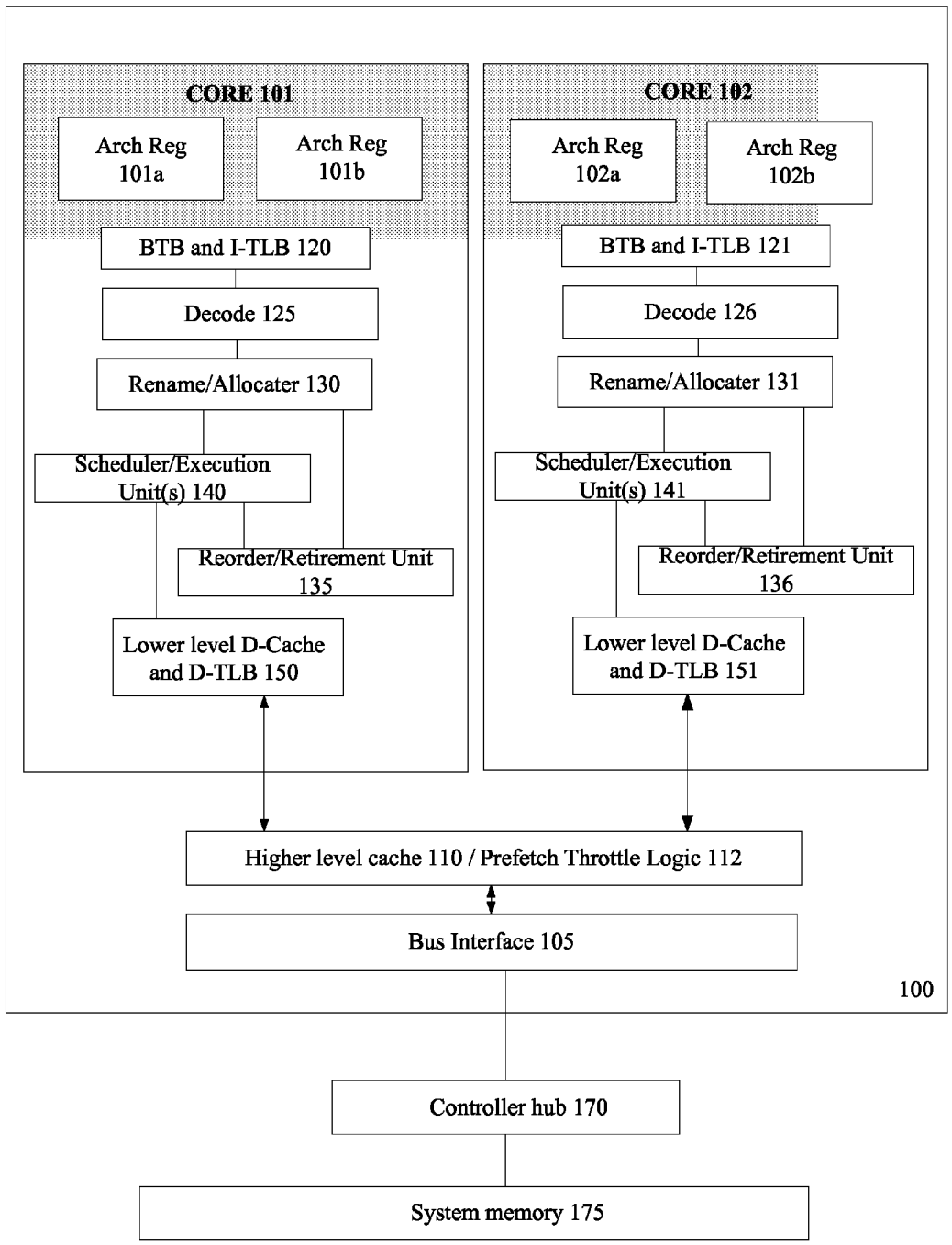
FIG. 1 illustrates an embodiment of a processor including multiple processing elements.

Referring to FIG. 1, an embodiment of a including multiple cores is illustrated. Processor 100, in one embodiment, includes core hopping hardware—not shown—to move contexts between cores. In another embodiment, processor 100 includes power hardware—not shown—to individually place cores in low power states. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core hopping may be utilized to alleviate thermal conditions on one part of a processor. However, hopping from core 101 to 102 may potentially create the same thermal conditions on core 102 that existed on core 101, while incurring the cost of a core hop. Therefore, in one embodiment, processor 100 includes any number of cores that may utilize core hopping. Furthermore, power management hardware included in processor 100 may be capable of placing individual units and/or cores into low power states to save power. Here, in one embodiment, processor 100 provides hardware to assist in low power state selection for processing elements of processor 100, as well as potentially for individual modules/units that are illustrated and discussed in more detail below.

Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently. In one embodiment, hopping of contexts refers to core hopping; however, in other embodiments, thread hopping may be performed either separately from or in conjunction with core hopping.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

Note, in the depicted configuration that processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. To illustrate the potential for a different configuration, the discussion now turns to FIG. 2, which depicts an embodiment of processor 200 including an on-processor memory interface module—an uncore module—with a ring configuration to interconnect multiple cores. Processor 200 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices.

In one embodiment, caching agents 221-224 are each to manage a slice of a physically distributed cache. As an example, each cache component, such as component 221, is to manage a slice of a cache for a collocated core—a core the cache agent is associated with for purpose of managing the distributed slice of the cache. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204.

Much like cache agents handle traffic on ring interconnect 250 and interface with cache slices, core agents/components 211-214 are to handle traffic and interface with cores 201-204, respectively. As depicted, core agents 221-224 are referred to as Processor Core Interface Logic (PCIL)s; they may also be referred to as core components, agents, or other known logic, units, or modules for interfacing with a processing element Additionally, ring 250 is shown as including Memory Controller Interface Logic (MCIL) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

Embodiments of Avoiding Inefficient Core Hops

Figure 2:
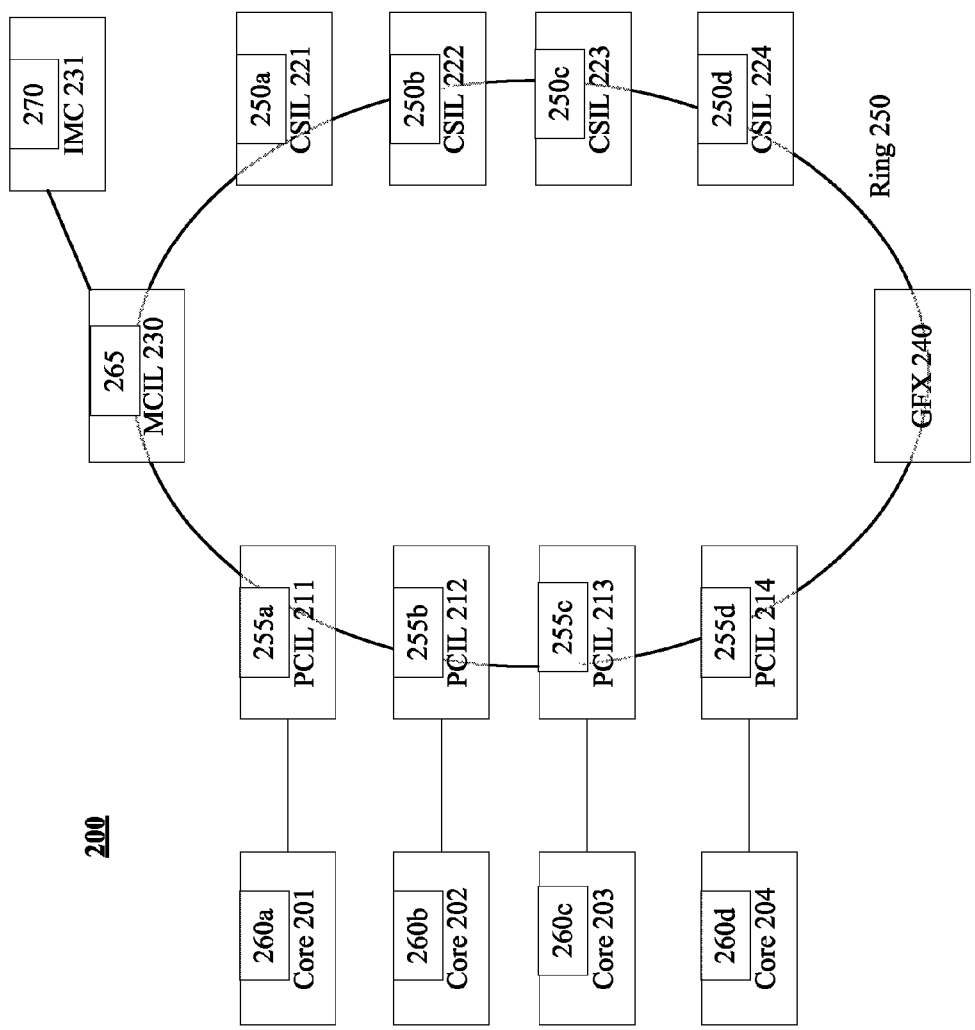
FIG. 2 illustrates another embodiment of a processor including multiple processing elements.
Figure 3:
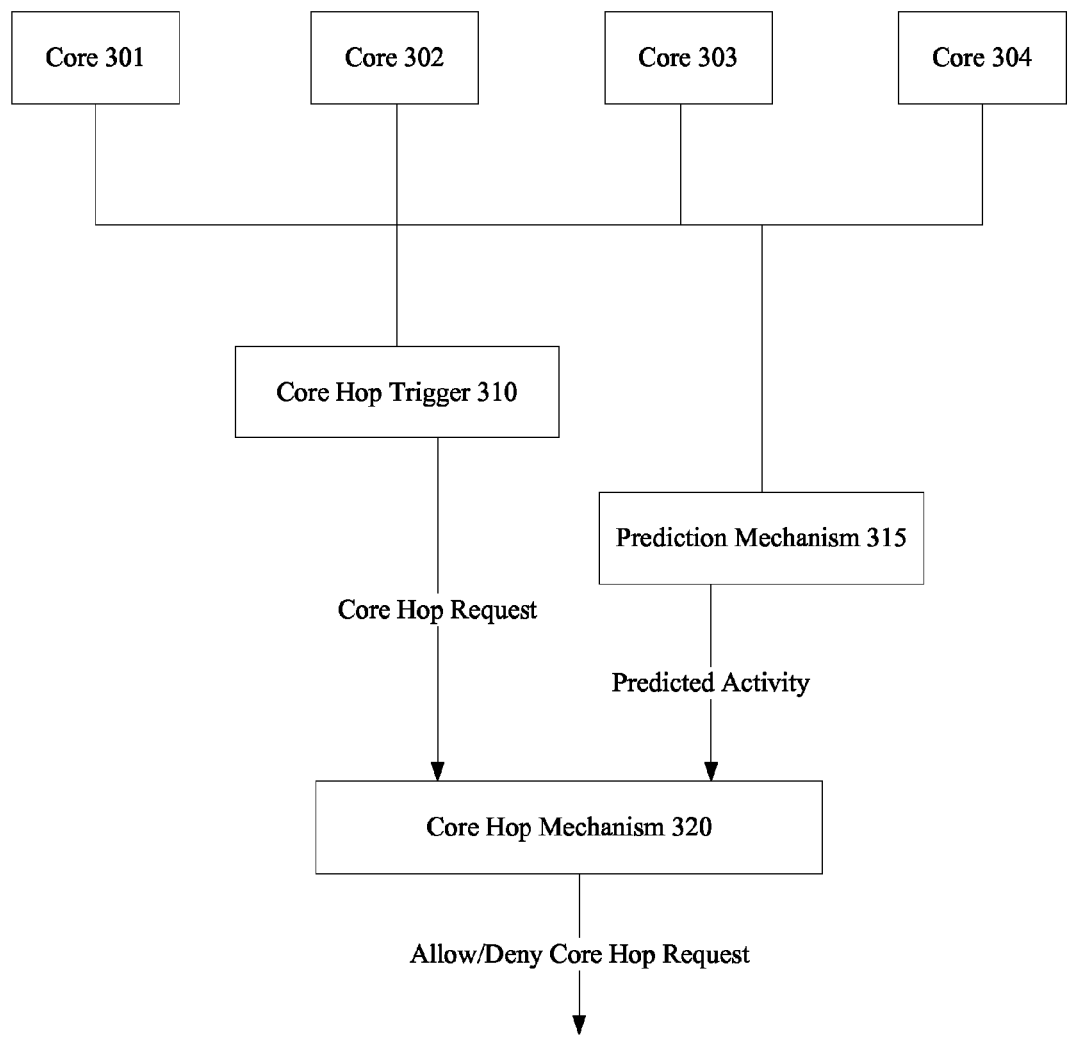
FIG. 3 illustrates an embodiment of mechanisms to avoid inefficient core hopping.

In one embodiment, a processor, such as the processor illustrated in FIG. 1, illustrated in FIG. 2, or other processor not illustrated, is to avoid inefficient core hops. Turning to FIG. 3, an embodiment of a processor capable of avoiding such inefficient core hops is illustrated. In this illustration, a core hop refers to a movement of a context or architectural state from a core, such as core 302, to another core, such as core 303. Core hop trigger mechanism 310 is to trigger a core hop, or a core hop event, based on any known conditions for a core hop. For example, a core hop is capable of being triggered based on a thermal density condition. In other words, when a portion of a processor, or more specifically a core of a processor, is too hot; then a core hope, in some scenarios, may be able to alleviate the thermal density condition—spread the workload and correspondingly the heat over to other physical locations of the processor.

As a specific illustrative example, assume cores 301 and 302 are collocated on a processor and are operating at full capacity, which is causing too much heat to be generated on a portion of a processor—a thermal density condition. Based on any known apparatus or method to indicate such a condition, core hop trigger logic 310 generates/triggers a core hop request. In response to the request, a core hop mechanism/manager may perform a core hop. In this scenario, core hop mechanism 320 may initiate a migration of core 301's architectural state, which may include one or more or potentially all hardware thread contexts on core 301, to another core, such as core 304. As a result, the processor's workload is spread over the processor, which potentially also distributes the heat.

However, performing a core hop only on current heat information, as above, without some additional information regarding future activity prediction potentially results in allowing inefficient core hops. As an example, in the situation above, core 301 during a next interval may be planning to idle, which would result in a self-alleviation of the thermal density condition; the idle would not generate much heat. Yet, with no prediction, the cost both in power and wasted execution time is incurred for the core hop, when it could have been avoided by predicting the future idle. In another example, three out of the four illustrated cores—301,302, and 304—have sizable workloads causing a thermal density condition that would result in a core hop. However, hopping a busy core's context to core 303 may not alleviate the thermal density condition because of the proximity of core 303 to the other cores, which are still busy.

Therefore, in one embodiment, prediction mechanism 315 is to predict future activity of the plurality of processor cores for a future interval. An interval, as referred to herein, may refer to an amount of time, a number of execution cycles, or any other temporal measurement. For example, the interval may have a range of a few cycles to a few thousand microseconds. Similarly, any known method for predicting activity of a processor, core, processing element, or other execution engine may be utilized to predict the activity of processor cores 301-304 during a future/next interval. Generalized, illustrative examples of such prediction include: utilizing a past activity of the plurality of processor cores during a previous interval as the future activity of the plurality of processor cores for the future interval; receiving an activity hint from a software entity and predicting future activity based on the activity hint, performing an arithmetic or statistical prediction of future activity; utilizing a prediction algorithm, such as a Kalman filter algorithm, to predict the future activity; and utilizing past idle, low power state residency to predict future activity.

Figure 4:
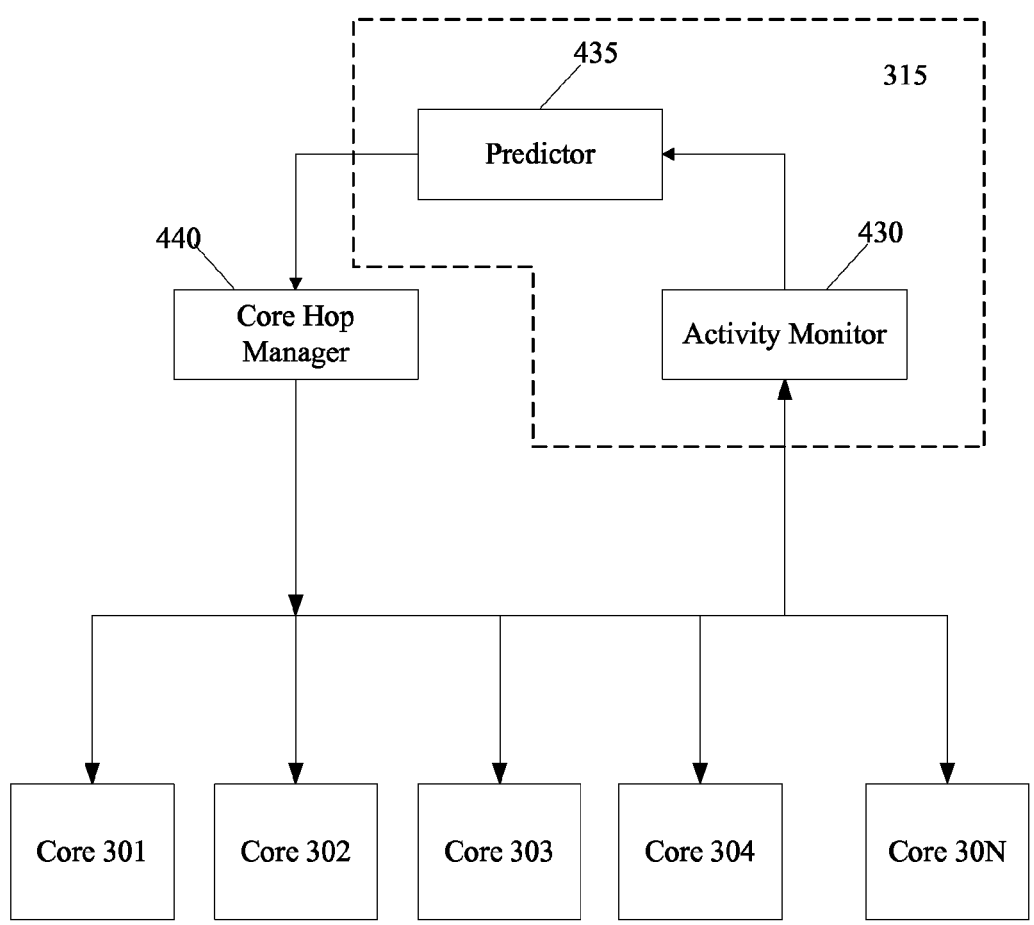
FIG. 4 illustrates an embodiment of a prediction mechanism of FIG. 3 to predict future activity.

Referring to FIG. 4 an embodiment of predicting future active and idle state residency is illustrated. In one embodiment, predictor 435, which is included in prediction mechanism 315, may use a Kalman filter algorithm. Based on data from cores 301-30N's active—sometimes referred to as a working or C0 state—and lower power—sometimes referred to as non-working or C2-CN state—residency, a prediction is computed. Note that within the discussion specific reference is made to specific, low power states, such as C-states, to further the discussion. However, utilizing idle and/or active residency may be associated with any form of power states, performance states, global states, or other form of activity or non-activity indicator.

C-states most generally refer to power states as defined by The Advanced Configuration and Power Interface (ACPI). Examples of types of processor, or core, power states according to the ACPI include: C0 is operating/active type of state; C1—often known as Halt—is a type of state where the processor is not executing instructions but can return to an executing state essentially instantaneously; C2—often known as Stop-Clock—is a type of state where the processor maintains all software-visible state, but may take longer to wake up; and C3—often known as Sleep—is a type of state where the processor does not need to keep its cache coherent, but maintains other state. Some processors have variations on the C3—Deep Sleep (C4), Deeper Sleep (C5), Deepest Sleep (C6)—that differ in how long it takes to wake the processor and the amount of power savings. Note that some of the types of C-states described herein are for an exemplary processor, such as an advanced Intel® Architecture 32 (IA-32) processor available from Intel Corporation, Santa Clara, Calif.; although embodiments may equally be used with other processors. Here, the C-states for an Intel® processor may not directly line up with the ACPI specification; yet, for the discussion both sets of active/inactive states are equally suitable. In other words, processors may map any number of their own customized C-states to the ACPI type of C-states described above.

Continuing the discussion from above, once predictor 435 utilizes the Kalman filter algorithm to compute the prediction based on data from activity monitor 430, then core hop manager 440 is able to make a decision for whether or not to avoid a core hop based on the prediction decision. As a result, activity monitor 430 may monitor data to determine the active or idle information, as discussed above. Examples of data associated with these power states, which may be monitored by monitor 430, include power state entry/exit events, such as entry/exit events for cores 301-30N during a monitor period or interval, as well as computation of residency in such states based on the entry/exit events or other counts. From this, an overlapping of active-idle cores in the same package is computed. In one embodiment, the interval of activity monitoring and prediction may be every 500 μs; however, this may easily range from a few execution cycles to thousands of microseconds.

Activity monitor 430, as mentioned above, may thus receive incoming data from the various cores 301-30N regarding their current or past activity levels. In one embodiment, activity monitor 430 includes a buffer, which may be arranged in various manners. For example, the buffer may be adapted to store, for each core 301-30N, an indication of a time stamp associated with each power state change event. Here, activity monitor 430 thus intercepts and time stamps the events in which CPU cores 301-30N enter and exit power states. In one embodiment, the record is stored in a kernel buffer. Then, at predetermined intervals, such as the interval described above, activity monitor 430 provides monitored data to predictor 435. This monitored data may thus include time stamp data as well as the activity state to indicate, during the interval of storage, how long each core was in a given state.

In response, predictor 435 may use this information to generate a pattern distribution for predicted core states for the next interval. While not limited in this regard, in one embodiment predictor 435 may execute a given prediction algorithm such as a Kalman filter algorithm to generate this pattern distribution. Furthermore, understand that the pattern distribution may vary widely, depending on a number of low power states supported, as well as a given number of cores, length of the prediction period and so forth. For ease of discussion, a pattern distribution including three different patterns will be described herein, such as the three aggregate patterns discussed in more detail with reference to FIG. 5. However, it's to be understood the scope of the present invention is not limited in this regard and in different embodiments, more or fewer such patterns may be provided, such as with varying granularities as to a number of cores at a given activity level.

This pattern distribution information is thus provided from predictor 435 to core hop manager 440, which may allow or disallow a core hop request based on the pattern distribution. As an example, a specific aggregate idle-activity pattern for a next interval may indicate that a core hop would be efficient. Here, core hop manager 440 allows the core hop in response to the aggregate pattern distribution and/or residency being above a threshold residency. In other words, if cores 301-30N are predicted to have an active-idle pattern resident for long enough that a core hop would be deemed feasible and efficient, then the core hop is allowed. In contrast, if other idle-activity patterns, which are not efficient or not feasible, are predicted to be resident instead of the efficient pattern, as indicated by the residency of the efficient pattern being below the threshold, then core hop manager 440 disallows or denys the core hop request. As a result, in this example, unnecessary, inefficient, or infeasible core hops may be avoided based on future prediction of core 301-30N's activity.

In one embodiment, the following three patterns may be calculated to predict activity: (1) PatternA: package is idle (all cores inside are idle); (2) PatternB: package is busy (all cores inside are busy); and (3) PatternC: package partial idle (remaining cases—at least one core is busy and at the same time at least one core is idle). This third pattern depicts an idle/busy overlapping scenario. From the example above, it can be seen that cores 301-30N's entry/exit power state time stamps are made available by activity monitor 430. And, as a result, the three pattern distribution, prediction may be computed. An example output of a prediction in accordance with one embodiment of the present invention is shown in Table 1, assuming a 500 μs interval period.

TABLE 1

| | |
|---|---|
| % PatternA in next T1 | 25% (25%*500 = 125 μs package in patternA) |
| % PatternB in next T1 | 15% (15%*500 = 75 μs package in patternB) |
| % PatternC in next T1 | 60% (60%*500 = 300 μs package in patternC) |

Thus, as shown in Table 1 for an interval period T1, an idle package pattern is predicted for 25% of the time (i.e., 125 μs), while all cores are predicted to be active for 15% of the time (i.e., 75 μs), and during the remaining 60% of the next prediction period, at least one core is active and at least one core idle (i.e., 300 μs). The manner of generating these pattern predictions may vary in different embodiments. In one embodiment, the predictions may use a Kalman filter, as will be discussed further immediately below; however, other implementations are possible.

A Kalman filter model (KFM) models a partially observed stochastic process with linear dynamics and linear observations, both subject to Gaussian noise. It is an efficient recursive filter that estimates the state of a dynamic system from a series of incomplete and noisy measurements. Based on a KFM, cores 301-30N's activity may be set forth in a number of predetermined patterns (e.g., percentage/residency of Patterns A, B and C, as well as other patterns, such as those described below in reference to FIG. 5) that are considered the observations of a real number stochastic process discretised in the time domain, denoted by $y_{1:t}=(y_1 \ldots y_t)$. The hidden state of the process, $x_{1:t}=(x_1 \ldots x_t)$, is also represented as a vector of real numbers. The linear stochastic different equation in KFM is:

$$x(t)=Ax(t-1)+w(t-1)\ p(w) \sim N(0,Q)\ x(0) \sim N(x_{1|0}, V_{1|0}) \quad [\text{EQ. 1}]$$

And the measurement equation is:

$$y(t)=Cx(t)+V(t)\ p(v) \sim N(0,R) \quad [\text{EQ. 2}]$$

The n×n transition matrix A in the difference Equation 1 relates the state at the previous t−1 time step to the state at the current step t, in the absence of either a driving function or process noise. Here n is the number of hidden states. In our task, m=n is the number of possible CPU activity states. $x_{1|0}$, $V_{1|0}$ are the initial mean and variance of the sate, Q is the system covariance for the transition dynamics noises, and R is the observation covariance for the observation noises. The transition of observation functions is the same for all time and the model is said to be time-invariant or homogeneous.

Using KFM, values can be predicted on the future time, given all the observations up to the present time. However, we are generally unsure about the future, and thus a best guess is computed, as well as a confidence level. Hence a probability distribution over the possible future observations is computed, denoted by $P(Y_{t+h}=y|y_{1:t})$, where k>0 is the horizon, i.e., how far into the future to predict.

Given the sequence of observed values $(y_1-y_t)$, to predict the new observation value is to compute $P(Y_{t+h}=y|y_{1:t})$ for some horizon k>0 into the future. Equation 3 is the computation of a prediction about the future observations by marginalizing out the prediction of the future hidden state.

$$P(Y_{t+h} = y \mid y_{1:t}) = \sum_x P(Y_{t+h} = y \mid X_{t+h} = x) P(X_{t+h} = x \mid y_{1:t}) \quad [\text{EQ. 3}]$$

In the right part of the Equation, we compute $P(X_{t+h}=x|y_{1:t})$ by the algorithm of the fixed-lag smoothing, i.e., $P(X_{t-L}=x|y_{1:t})$, L>0, L is the lag. So before diving into the details of the algorithm, a fixed-lag smoothing in KFM is first introduced.

A fixed-lag Kalman smoother (FLKS) is an approach to perform retrospective data assimilation. It estimates the state of the past, given all the evidence up to the current time, i.e., $P(X_{t-L}=x|y_{1:t})$, L>0, where L is the lag, e.g., we might want to figure out whether a pipe broke L minutes ago given the current sensor readings. This is traditionally called "fixed-lag smoothing", although the term "hindsight" might be more appropriate. In the offline case, this is called (fixed-interval) smoothing; this corresponds to computing $P(X_{T-L}=x|y_{1:T})$, $T \geq L \geq 1$.

In the prediction algorithm, there are h more forward and backward passes. The computation of the passes is similar to that in the smoothing process. The only difference is that in the prediction step the initial value of the new observation is null, which means $y_{1:T+h}=[y_{1:T} y_{null}^1 \ldots y_{null}^h]$. The prediction algorithm estimates the value of the $y_{1:T+h}=[y_{1:T} y_{T+1} \ldots y_{T+h}]$ by performing retrospective data assimilation on all the evidence up to the current time plus the $y_{1:T+h}=[y_{1:T} y_{null}^1 \ldots y_{null}^h]$. In practice, we consider using the previous steps as the prior data, for example, if h=1, then $y_{T+1}=(y_{T-1}+y_T)/2$ rather than $y_{T+1}$=null.

Table 2 shows the pseudo code of the prediction algorithm.

TABLE 2

```
function Predicting (y_{1:T}, x_{1|0}, V_{1|0}, A, C, Q, R)
    x_{0|0} = x_{1|0}
    V_{0|0} = V_{1|0}
    y_{T+1} = (y_{T-1} + y_T)/2;
    for t = 1:T+1
        (x_{t|t}, V_{t|t}, L_t) = Fwd(y_t, x_{t-1|t-1}, V_{t-1|t-1}, A, C, Q, R)
    end
    for t = T:-1:1
        (x_{t|T}, V_{t|T}, V_{t-1,t|T}) = Back(x_{t+1|T}, V_{t+1|T}, x_{t|t}, V_{t|t}, A, Q)
    end
```

In Table 2, Fwd and Back are the abstract operators. For each Fwd (forwards pass) operation of the first loop (for t=1:T), we firstly compute the inference mean and variance by $x_{t|t-1}=Ax_{t-1|t-1}$ and $V_{t|t-1}=AV_{t-1|t-1}A'+Q$; then compute the error in the inference (the innovation), the variance of the error, the Kalman gain matrix, and the conditional log-likelihood of this observation by $err_t=y_t-Cx_{t|t-1}$, $S_t=CV_{t|t-1}C'+R$, $K_t=V_{t|t-1}C'S_t^{-1}$, and $L_t=\log(N(err_t; 0, S_t))$ respectively; finally we update the estimates of the mean and variance by $x_{t|t}=x_{t|t-1}+K_t err_t$ and $V_{t|t}=V_{t|t-1}-K_t S_t K_t'$.

For each Back (backwards pass) operation of the second loop (for t=T-1:-=1:1), at first we compute the inference quantities by $x_{t+1|t}=Ax_{t|t}$ and $V_{t+1|t}=AV_{t|t}A'+Q$; then compute the smoother gain matrix by $J_t=V_{t|t}A'V_{t+1|t}^{-1}$, finally we compute the estimates of the mean, variance, and cross variance by $x_{t|T}=x_{t|t}+J_t(x_{t+1|T}-x_{t+1|t})$, $V_{t|T}=V_{t|t}+J_t(V_{t+1|T}-V_{t+1|t})J_t'$, and $V_{t-1,t|T}=J_{t-1}V_{t|T}$ respectively, which are known as the Rauch-Tung-Striebel (RTS) equations.

The computation as set forth in Table 2 can be complicated, e.g., there are matrix inversions in the T+1 step loop, when computing Kalman gain matrix in Fwd operator and the smoother gain matrix in Back operator. And the computational complexity will be $O(TN^3)$, where T is the number of history observations; N is the number of activity states, because for a general N*N matrix, Gaussian elimination for solving the matrix inverse leads to $O(N^3)$ complexity. However, in various embodiments the algorithm implementation may be simplified. A more specific discussion of utilizing a KFM to predict future activity for power state selection is described in a co-pending application entitled, "Saving Power in A Computer System," having application Ser. No. 11/955,326.

Figure 5:
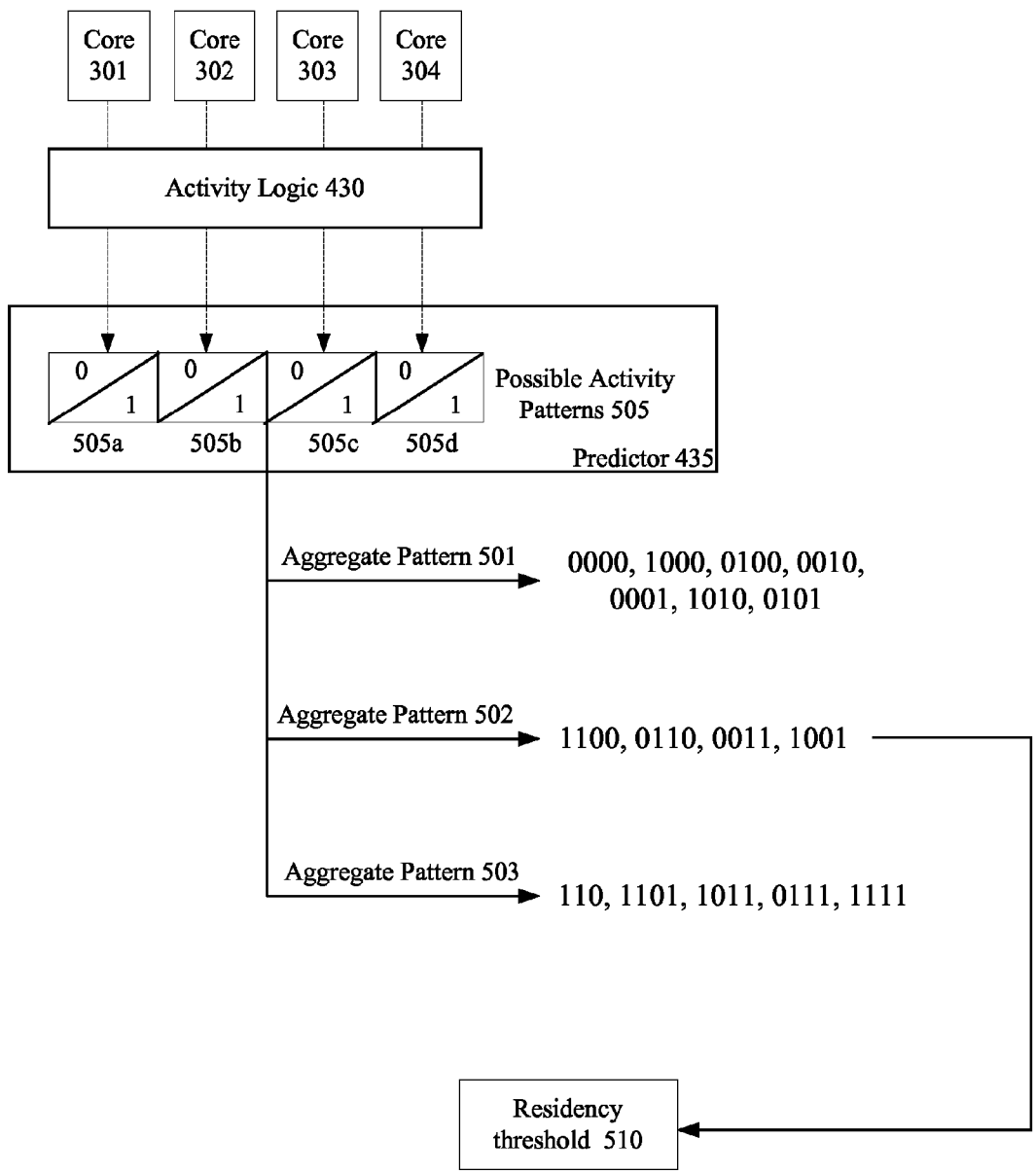
FIG. 5 illustrates an embodiment of utilizing residency of idle-activity patterns for prediction of future activity.

Referring now to FIG. 5, an embodiment of potential activity patterns, which may also be referred to as idle-activity patterns, predicted activity, future activity, next interval activity, activity representation, idle-activity representation, etc., is illustrated. Here, predictor 435 is depicted as predicting three aggregate, idle-activity patterns 501, 502, and 503. In this illustration a logical one represents a core is active—in a working or C0 state—and a logical zero represents the core is idle—in a non-working or non-C0 power state. However, any grouping of power states may be included within the definition of "active" and "idle," such as C0 and C1 being considered active and C2-C6 being considered idle/inactive. Consequently, in the depicted example, of possible activity pattern 505, fields 505a-d correspond to activity of cores 301-304, respectively. Here, each field may represent a predicted activity or inactivity during a next or future interval, which results in sixteen possible idle-activity patterns for four cores. Extrapolating from this simple examples there potentially exists $2^N$ patterns for N cores.

A prediction mechanism, including predictor 435, may predict any form of residency for all of the possible $2^N$ patterns for a future/next interval and then aggregate them into aggregate patterns as illustrated. However, any subset of the $2^N$ patterns may be predicted as aggregate patterns. Additionally, even when predicting aggregate patterns, residency of each of possible pattern may also be predicted. Furthermore, the aggregation of patterns may be performed in any manner, such that the groupings may differ from the illustration of FIG. 5. Moreover, expression of residency of a pattern may be done in any form, such as a distribution of residency, a percentage of residency in an interval, a temporal amount of residency in a next interval, or other expression of a time or amount that a pattern is predicted to occur in a future interval.

Here, the predicted patterns of activity for cores 301-304 are aggregated into three groups: 501, 502, 503. Although not depicted, the most basic way to determine if a core hop is efficient—to be allowed—is to aggregate patterns into two groups: activity patterns efficient for core hoping and activity patterns inefficient for core hoping. Essentially, as shown, aggregate pattern 502, in this example, includes aggregated patterns that are determined to be "efficient" for core hoping, while patterns 503 and 501 include patterns that are determined to be "inefficient." However, this example draws a distinction between inefficiency. Pattern 501 includes patterns where core hopping is feasible—may be performed easily—but there is no need for core hopping. Specifically, the gain for a thermal density condition associated with the patterns aggregated in pattern 501, such as 0000 or 0101, are not considered beneficial when weighed against a temporal penalty—time to perform core hop that execution is stalled.

For example, assume core's 301-304 are resident in a ring topology, such that core 301 is adjacent to cores 302 and 304, accordingly. Here, if a core hop for core 304 is requested when the current activity includes 0101, a hop of the context from core 304 to core 303 may temporarily relieve a heat problem on core 304. However, from a totality perspective, the thermal problem may get worse, since the activity pattern is now 0110, where core's 302 and 303 are located next to each other instead of spread out in 0101. Not only may the entire thermal condition of the processor package worsen in this case, but the heat condition on a per core basis may just be transferred to 303. Yet, in some implementations, designers may deem this pattern efficient and aggregate it with other efficient patterns, accordingly.

Pattern 503, on the other hand, includes patterns, which may benefit from a core hop. But a core hop is potentially inefficient due to infeasibility or the lack of substantial thermal condition alleviation when compared to the temporal, execution penalty incurred by a core hop. For example, a pattern of 1111 indicates cores 301-304 are all busy. Therefore, a hop from one core to another is merely a switching from one active core to another. Additionally, patterns, such as 1011, may be included within this subset group, because switching/hopping of context from core 301 to core 302 to obtain the pattern 0111 may make the initiating thermal condition even worse, as described above.

Note that these groupings, aggregations, or subsets of the possible $2^N$ patterns are not limited to groupings based on weighing of potential thermal condition alleviation versus temporal penalty to execution or temporal penalties. In fact, in some cases, a core hopping policy may group purely upon feasibility. In this embodiment, if a core hop is feasible it's determined efficient, while infeasible core hops are determined inefficient. Therefore, a prediction mechanism may implement any policy to group idle-activity patterns into aggregate patterns. Furthermore, aggregation may include any grouping or association of patterns. In one embodiment, aggregation includes aggregating residencies of patterns. For example, assume residency, such as the residency of aggregate pattern 502, is expressed as a percentage of an interval, such as 70%, which may be easily converted to an amount of time for an interval (70%*500 µs=350 µs). This essentially indicates that predictor 435 is predicting that during the future 500 µs interval that some version of the patterns that make up aggregate pattern 502 will reside for 350 µs, or 70% of the interval.

To further the example, assume that predictor 435 predicted that pattern 1100 is to be resident for 10% of the next interval, pattern 0011 is to be resident for 30% of the next interval, and pattern 1001 is to be resident for 10% of the next interval. In this example, aggregation simply includes the sum of the individual patterns—10%+20%+30+10%—to obtain the aggregate residency of 70%. However, as stated above, aggregation may include any grouping of patterns, or residencies therefore. Note that the actual residency of individual and aggregate patterns may vary in comparison to the predicted residencies. However, during simulation it was found that predictors, such as predictor 435, may be extremely accurate. In fact, one set of simulations indicated that a predictor on a four core processor had only a 4.34% relative error. In other words, if the predictor predicts a residency of a pattern, such as 0101, of 300 µs for a 500 µs interval, then the actual, measured result came out that the pattern was resident for between 287 µs and 313 µs.

In one embodiment, during an interval, core hopping mechanism 320 or core hop manager 440 is to determine if core hopping is efficient based on the future/predicted activity of the plurality of processor cores for the interval. Note that some or all of this determination may be made in prediction mechanism 315, as well as potentially in other logic. Continuing the example from above, once predictor 435 has predicted the residencies for aggregate patterns 501, 502, and 503, core hop manager 440 determines if a core hop is efficient. In one embodiment, determining a core hop is efficient includes determining if the aggregate group of efficient core hop patterns is predicted to be resident long enough in the next interval to deem core hopping efficient.

For example, it's determined if the residency of aggregate pattern 502 of efficient core hop patterns is above a threshold, such as a residency threshold. Note that the threshold may include any percentage, time, distribution or other value corresponding to the expression of pattern residency. For the sake of illustration, assume the threshold is 60%. In the example above, where the residency of aggregate pattern 502 includes 70%, the predicted, efficient idle-activity pattern exceeds the threshold—is predicted to be resident for longer than the threshold. Here, core hop manager 440 allows the core hop, because it's determined to be efficient. However, if the threshold was 75%, then core hop manager 440 would deny the core hop, as the efficient pattern is not predicted to be resident long enough in the interval. Note that in some embodiments, the residency threshold may be predetermined, while in other embodiments it may be dynamically adjustable by privileged level entities, non-privileged level entities, or a combination thereof.

In one embodiment, core hop manager 440 may also determine an optimal configuration for core hops based on the core hop request. For example, core hop manager, in response to receiving a hop request from core 304, may poll activity monitor 430 to determine a current active-idle pattern or utilize the prediction of a pattern's residency in the interval to select a hop for optimal configuration. Here, assume that a single pattern, 0011, is predicted to have the longest residency during the next interval. Then, in response to the core hop request, core manager may determine that 304's context is to be hopped to core 301, not 302, since in the most resident pattern—0011—during the interval; cores 302 and 303, which are located next to each other, would be active at the same time. Determination of an optimal configuration is not limited to being based on a single pattern. Instead, a combination or aggregation may be used. For example, predicted patterns indicating specific cores are active may be combined and the combination's residency evaluated to determine an optimal core hop.

Also note that core hop mechanism 320's determination may not be made on activity patterns, but rather in some embodiments may be made on any future activity prediction, which may be utilized to indicate if a core hop is efficient. In fact, numerous examples are describe above before the discussion of FIG. 4 for future activity prediction. Therefore, any known method or apparatus for determining if a core hop would be efficient may be utilized. Furthermore, it's important to note, once again, that the subset groupings of the aggregate patterns depicted are purely illustrative both in number and content.

Figure 6:
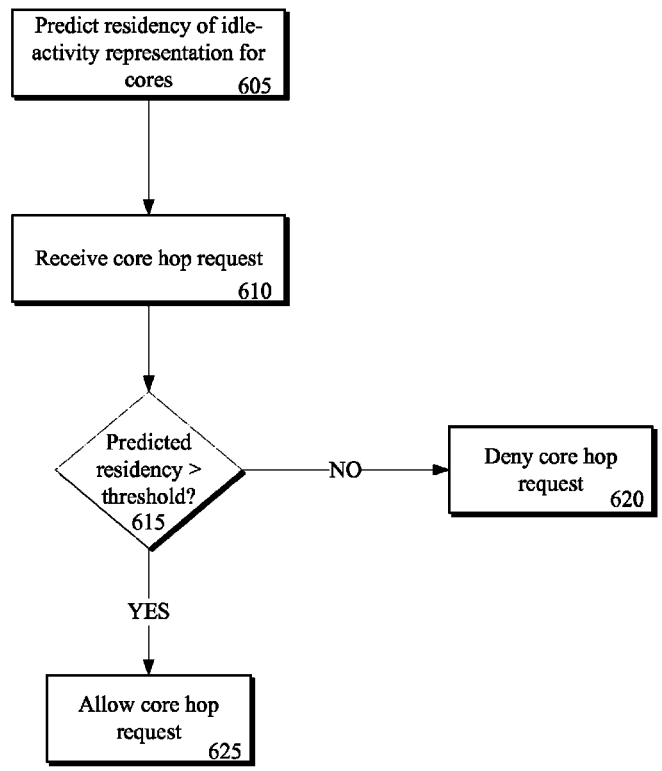
FIG. 6 illustrates an embodiment of prefetch a flow diagram for a method of avoiding an inefficient core hop.
Figure 9A:
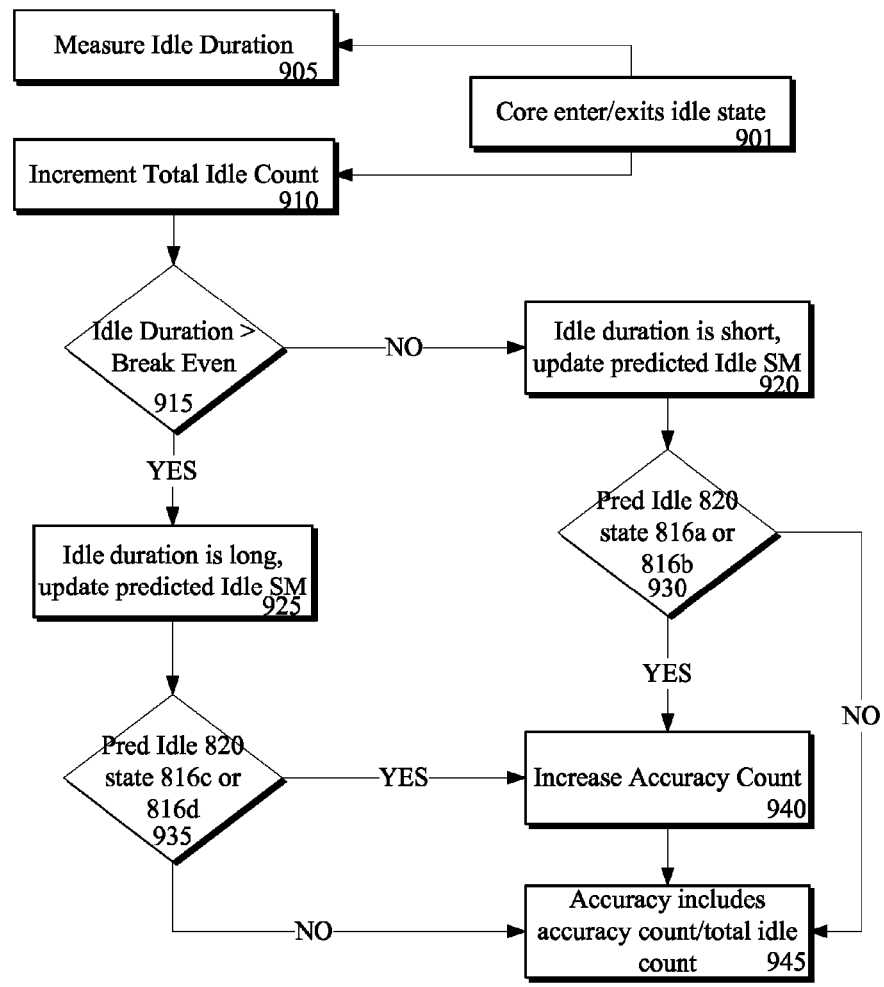
FIG. 9*a* illustrates an embodiment of a flow diagram for a method of providing hardware assisted low power state selection.

Turning the discussion to FIG. 6 an embodiment of a method for avoiding inefficient core hopping is depicted. Although the flows of FIG. 6 and FIG. 9a below are illustrated in a substantially serial fashion, each of the flows may be performed at least partially in parallel or in a different order. Furthermore, some of the illustrated flows may be omitted, while other flows may be included in different embodiments. For example, a residency may be predicted at the end of a previous interval for a next or future interval. During simulations prediction averaged about 6.5 micro-seconds. Therefore, an interval may end, prediction may begin, and a core hop request may all occur partially in parallel. As a result, the order of flows shown both in FIGS. 6 and 9a are purely illustrative.

In flow 605 a residency of an idle-activity representation for a plurality of cores on a processor during a future interval is predicted. As stated above, the idle-activity representation may include any known representation of processing element activity. In one example, the idle-activity representation includes a first aggregate idle-activity pattern of a number of efficient idle-activity patterns. Here, activity of N cores may be represented by $2^N$ patterns, where the efficient idle-activity patterns are determined to be efficient by platform policy, such as weighing a gain of core hopping to alleviate a thermal density condition and a temporal, execution cost of performing the core hope. A specific illustrative example of such an efficient idle-activity pattern is depicted as aggregate pattern 502 in FIG. 2. Note, as shown in FIG. 2, more than one aggregate pattern may be predicted and computed. In fact, residency of all of the possible $2^N$ patterns may be predicted and aggregated in one embodiment, while only subsets of the $2^N$ patterns and the aggregate patterns may be predicted and computed in other embodiments.

During the interval a core hop request is received. Note that core hop requests and their generation are not discussed in detail herein to avoid obscuring the discussion of whether to avoid the core hop request or not. However, a core hop request may be generated based on any known conditions, such as a thermal density condition, a workload condition, a failure condition, etc. Additionally, any entity may generate the core hop request. For example, the core hop request may be triggered by hardware, such as core hop trigger logic 310 in FIG. 3. The core hop request may also be generated by a privileged level software entity, such as a kernel or OS. In fact, some processor designers may choose to open the request mechanism to user-level code, such that core hop trigger logic 310 receives a user request and generates the core hop request.

In decision flow 615, it's determined if a predicted residency for the efficient idle-activity representation is above a threshold. For example, it's determined if the residency of aggregate pattern 502 is above a residency threshold. Note the alternative to this determination to reach the same end includes performing the prediction of a residency for an aggregate of inefficient patterns, such as patterns 501 and 503. And then, determining if that aggregate is below the threshold. Essentially, instead of determining if efficient core hop patterns are going to be resident for long enough that a core hop would be efficient, the last example determines if inefficient core hop patterns are not going to be resident long enough that a core would be efficient.

In response to the determination, which may include some form of comparison of the predicted residency to the residency threshold, the request is either allowed in flow 625 if the predicted residency is above the threshold—the core hop is efficient—or denied/avoided in flow 620 if the predicted residency doesn't exceed the threshold—the core hop is inefficient. Allowing a core hop may simply include letting normal core hop logic, such as logic to migrate state of one core to another, perform its task, while denying may include any form of block, disallowing, denying, or other operation to stop the core hop from occurring.

Embodiments of Hardware Assisted Low Power State Selection

Figure 7:
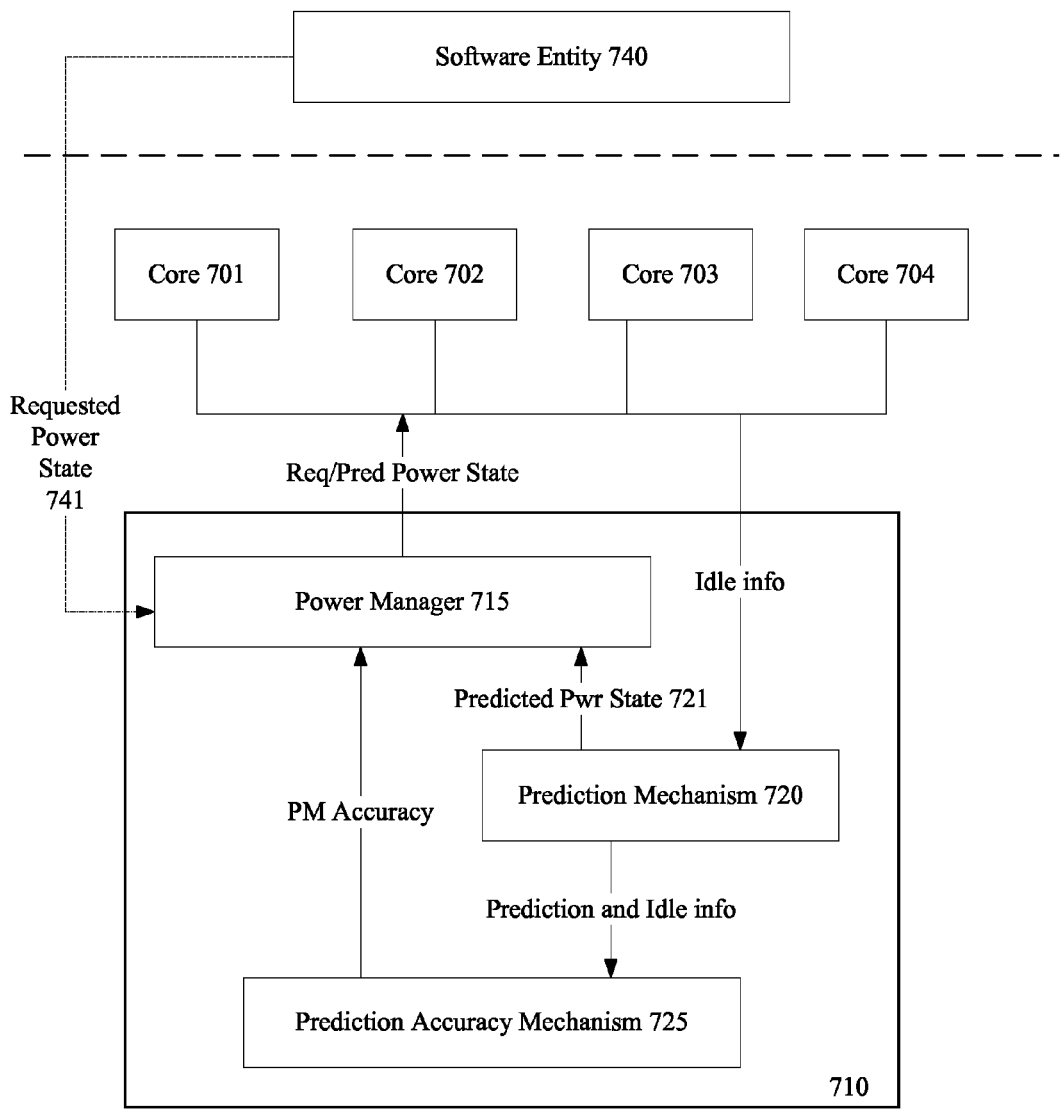
FIG. 7 illustrates an embodiment of providing hardware assisted low power state selection.

Turning next to FIG. 7 an embodiment of a processor including a power mechanism to select between a requested power state and a predicted power state based on prediction accuracy is depicted. As illustrated, power mechanism 710 receives a request for a core, such as core 701 of cores 701-704, to enter a requested power state. Note from the discussion above that the requested power state may include any power state, such as a C-state, ACPI power state, or other known power state. Previously, the requested power state was utilized by a power control unit purely based on software request 741. As a result, a software entity 740, such as an Operating System (OS), kernel, hypervisor, or virtual machine monitor (VMM), requests a power state for core 701, and the power state is entered accordingly. However, much like above with core hopping, without prediction of idle duration for core 701, core 701 may incur the cost/expense of entering a low power state and then be re-awakened in a short amount of time. In fact, in this case, core 701 may enter the low power state and reside there for less time than the amount of time it takes to wake core 701 from that power state. As an additional component, a co-pending application entitled, "Saving Power in a Computer System," having application Ser. No. 11/955,326 discusses hardware promotion/demotion of power states when a core resides in one power state over an amount of time. Note that hardware promotion and demotion may be utilized in conjunction with the apparatus' and methods described herein. For example, hardware may predict a predicted idle duration or a predicted power state, and software may request a requested power state. If the hardware is accurate, the predicted power state is selected. However, if the core resides in the predicted power state for too long, or not long enough, the power state may be subsequently demoted/promoted as discussed in the co-pending application.

In one embodiment, power mechanism 710 is to provide hardware assisted power state selection. In fact, as a potential optimization, the power state selection may be based on prediction accuracy, such that when hardware prediction accuracy is high, a hardware predicted power state is selected. And when hardware prediction accuracy is low, the software requested power state is selected. As a result, when hardware is accurately predicting the correct—most efficient for a future interval—power state, then hardware's selection takes priority, while hardware yields priority to software when the prediction mechanism is not highly accurate. In fact, during simulations it was found that operating system power management power-state selection is correct 34.8% of the time; an embodiment of pure hardware prediction was correct 92.7% of the time; and an embodiment of a hybrid of hardware assisted power state selection based on the hardware accuracy achieved the correct power state 94.3% of the time.

In one embodiment, power mechanism 710 includes prediction mechanism 720 to predict an idle duration, or a predicted power state. Note that prediction mechanism may predict the idle duration, such as a very long, long, short, or very short duration, and power states are associated therewith by hardware, firmware, software or a combination thereof. To illustrate, a very long and long duration may be associated with a deepest sleep state—C6—while the short and very short durations are associated with a sleep state—C3. In this illustration, use of the terms predicting a low power state, such as C3 and C6, is synonymous with stating that an idle duration is predicted, or vice-versa.

In one embodiment, prediction mechanism 720 is to increase or decrease a predicted idle duration in response to a measured idle duration. For example, during an interval, an activity monitor, such as monitor 430 from FIG. 4, determines/measures the idle duration of a core, such as core 701, utilizing counter logic and/or timestamps. Based on that idle duration, a future/predicted idle duration is updated, accordingly. As an illustrative example, the predicted idle duration is increased or decreased in response to the measured idle duration as compared to a break even threshold. If power is requested by software entity 740, then in one embodiment, the break even threshold includes a break-even time of a deepest, such as C6, power state. Note a break even time of C6 may be a predetermined. The break event time may also include an amount of time to wake from a C6 power state to an active state, as well as any other temporal metric associated with entering/exiting a power state.

Continuing the example, if the measured idle duration during the previous interval was longer than the C6 break even time, then the predicted idle duration is increased by prediction mechanism 720. Alternatively, if the measured idle duration during the previous interval was shorter than the C6 break even time, then the predicted idle duration is decreased by prediction mechanism 720. It's important to note that the break even time of a power state is a purely illustrative threshold value. And, any amount of time, or other value, may be utilized as a threshold value when comparing it with a measured/actual idle duration from an interval. As stated above, the predicted idle duration may correspond to a power state.

However, an update of predicted idle duration doesn't necessarily represent a change in predicted power state in some embodiments. To illustrate, in the example above, idle durations of long and very long were associated with C6 and short and very short with C3. As a result, an increase of the predicted idle duration from long to very long still represents a predicted power state of C6. However, if the measured idle duration is below the break even threshold, then the predicted idle duration is decreased from long to short, which does represent a change in predicted power state from C6 to C3. In the later case, assume a request is received for core 701 to enter a low power state, such as C6, from software entity 740. Prediction mechanism 720 has finished measuring idle duration for core 701 during an interval. Here, the measured idle duration is below a C6 break eventtime, which caused the prediction mechanism 720 to predict a short idle duration. Assuming hardware prediction is considered accurate at this point, power manager 715 may select the hardware predicted state of C3—based on the hardware predicted idle duration of short—for core 701 over the software, requested C6 state.

Yet, in one embodiment, selection of a hardware predicted power state is conditioned upon a prediction accuracy of the hardware prediction mechanism 720. Essentially, in this embodiment, a safeguard exists, whereby hardware predicted power states are not selected over software requested power states, when the hardware is not accurately predicting. Therefore, in one embodiment, prediction accuracy mechanism 725 is to predict a prediction accuracy of prediction mechanism 720. As an example, prediction accuracy mechanism 725 is to increase a prediction accuracy in response to the measured idle duration over the interval exceeding the break even threshold/duration and the predicted idle duration corresponding to a long idle duration. In other words, if the predicted idle duration is a long idle—longer than a threshold duration—and the actual, measured idle duration is also over the break even threshold, then the idle prediction was correct. So, prediction accuracy mechanism 725 increases the accuracy based on the determined, accurate prediction. However, prediction of a long idle duration and measurement of a similar long idle—exceeding a break even duration—is not the only prediction that may be determined accurate. As another example, a measurement of a short idle duration—less than the break even time—when a short idle duration is predicted also increases the prediction accuracy.

In a similar manner, prediction accuracy mechanism 725 is to decrease the prediction accuracy in response to the measured idle duration over the interval exceeding the break even duration and the predicted idle duration corresponding to a short idle duration. Furthermore, prediction accuracy mechanism 725 is to decrease the prediction accuracy in response to the measured idle duration over the interval not exceeding the break even duration—a measured short idle duration—and the predicted idle duration corresponding to the long idle duration.

Note that the examples above have dealt with predicting idle duration and determining the accuracy of such predictions is discussed. However, prediction is not so limited. As an example, prediction may include prediction of actual power states, or power state residencies, within an interval. Here, an activity monitor may gather data about entry/exit into such power states. And, the predictions are compared with the data to determine accuracy of direct power state prediction.

Yet, despite the method of prediction, once the hardware prediction is made, power manager 715 is to select the predicted state for a core, such as core 701, or the requested state for core 701 based on the prediction accuracy of power mechanism 720. In one embodiment, an accuracy threshold is provided. Here, if the prediction accuracy exceeds the accuracy threshold, then the hardware predicted power state is selected/utilized. However, if the prediction accuracy doesn't exceed the threshold, then the requested power state is selected.

Figure 8:
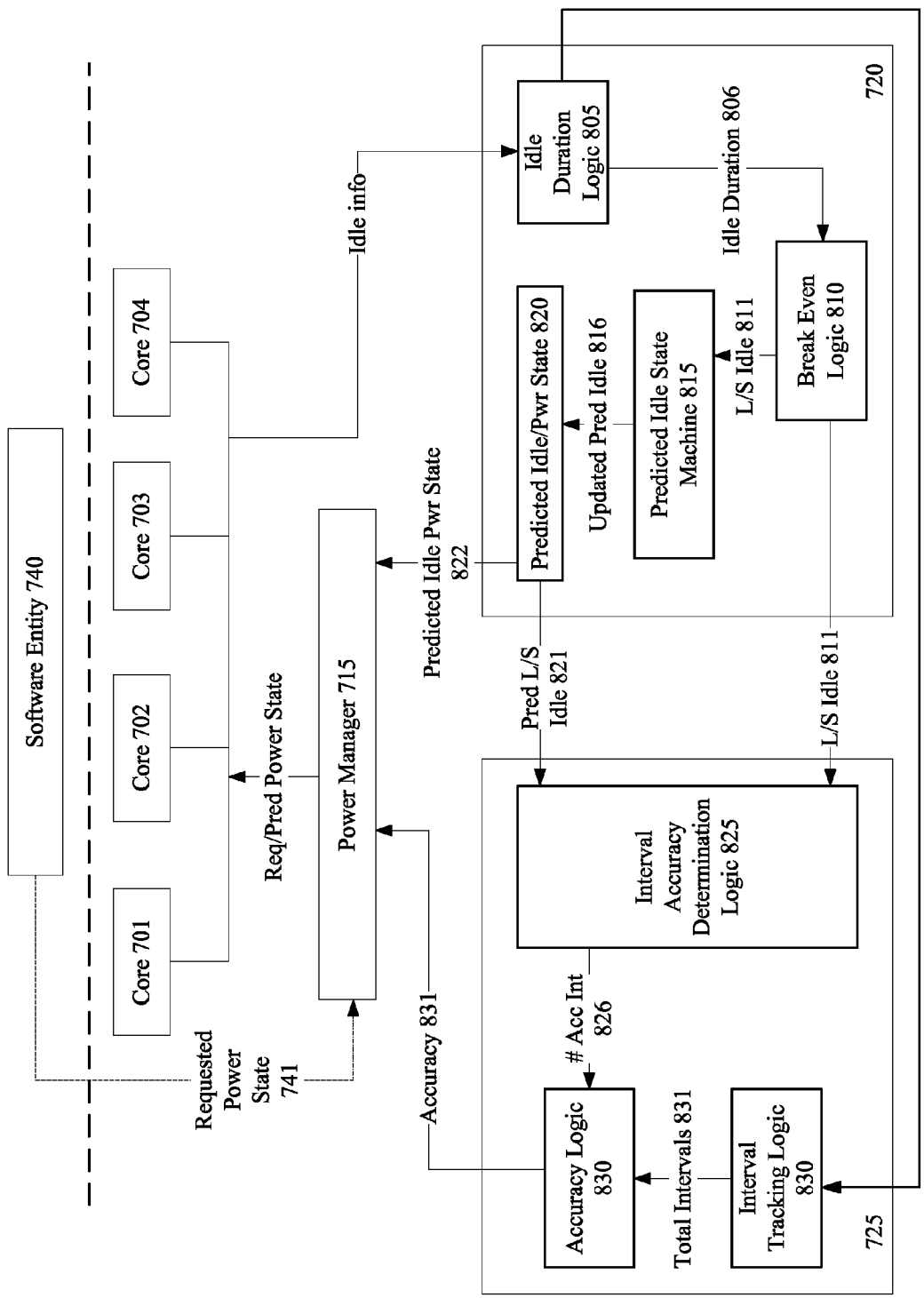
FIG. 8 illustrates another embodiment of providing hardware assisted low power state selection.

Referring next to FIG. 8 a specific illustrative embodiment of prediction logic to predict idle duration/power states and accuracy logic to determine prediction accuracy is depicted. In fact, a simplified, illustrative example utilizing exemplary numbers and states is discussed here to provide a look at operation of the logic in FIG. 8. Prediction logic 720 is to predict a predicted, low power state based on at least an idle duration of a core, such as core 701, of the plurality of cores over an interval. Here, idle duration logic 805 is to determine the idle duration of the core over the interval. As an example, the interval may be a timed interval, such as a 500 μs interval. Alternatively, the interval may include the idle duration itself. In this embodiment, when a core, such as core 701, enters a low power state—idle—count logic, such as a counter, is to count the idle duration for core 701. Note an activity monitor utilizing timestamps, as discussed in reference to FIG. 4, may also be utilized to determine an idle duration. Upon wake of core 701, prediction logic 720 updates its prediction and prediction accuracy logic 725 updates its accuracy of prediction logic 720, accordingly. In response to the wake, idle duration logic 805 provides the measured idle duration 806 to break even logic 810.

Break even logic 810 is to determine if the measured idle duration 806 is a long duration or a short duration. As discussed above, in one embodiment, a break even time of a power state, such as a C6 state, is utilized as a break even threshold. Although any break even value may be utilized, in this example, assume the break even threshold is 100 μs. As a result, if idle duration 806 exceeds 100 μs, then the idle duration of core 701 is determined to be a long duration. Inversely, if idle duration 806 is at or below 100 μs, then the idle duration is determined to be a short duration. As a simple example, break even logic 810 may include comparison logic to compare idle duration 806 to the break even duration of 100 μs.

Prediction state logic 815, 820 are to determine the predicted, low power state based on the break even logic, i.e. long or short idle determination from break even logic 810. Predicted idle/power state element 820 is to hold a previous predicted power state. Note that any number of power states and/or idle duration may be represented in element 820. As an illustrative embodiment, storage element 820 is to hold a two-bit representation of an idle state, which corresponds to power states. Here, 00 represents a very short idle duration, which corresponds to a C3 power state; 01 represents a short idle duration, which also corresponds to the C3 power state; 10 represents a long idle duration, which corresponds to a C6 power state; and 11 represents a very long idle duration, which also corresponds to the C6 power state. As a result, when a requested power state is received from software entity 740 for core 701, the predicted idle duration/power state 822 is provided to power manager 715 as the hardware predicted power state.

Yet, continuing the example from above, the predicted idle power state 820 may be updated by predicted idle state mechanism 815 based on long/short idle duration information 811. Quickly referencing FIG. 9b, an embodiment of a flow diagram for predicted idle state machine 815 is illustrated. As can be seen, based on the long/short idle determination from break even logic 810, the states of sate machine 815 are updated, accordingly. For example, if the previous state held in element 820 includes a 01—predicted short idle duration 816b—and a long idle duration is determined, then the long idle duration moves the state machine to state 816c—a predicted long idle state. This result may be held in state machine 815 and provided directly to power manager 715. Or as illustrated, the result is stored in element 820. Once updated idle duration prediction 816 is provided, the prediction cycle is essentially complete. Therefore, in response to a request from software entity 740 to enter a requested power state, such as C3; newly updated, predicted idle duration/power state—long idle duration corresponding to a C6 power state—is provided to power manager 715. Power manager 715 makes the selection between the C3, requested power state and the C6, predicted power state.

In one embodiment, this selection is made based on the accuracy of prediction logic 720. Going back to break even logic 810, the long/short idle duration determination is also provided to the interval accuracy determination logic. In addition, the previous state held in element 820, before the update by state machine 815, is also provided to logic 825. Essentially, the previously predicted idle duration is compared against the newly measured duration in the form of comparing whether the measured idle and predicted idle were both long idles or short idles. In other words, logic 825 determines if the prediction of core 701's idle was correct.

Interval accuracy determination logic provides an accuracy determination 826. In one embodiment, if the prediction was accurate, signal 826 is an increment signal to increment accuracy logic 830. Similarly, if the prediction was incorrect, signal 826 includes a no increment signal. As a result, accuracy logic 830 essentially counts the number of idle intervals that the prediction logic was correct. Furthermore, upon every idle duration measurement, the total interval tracking logic 830 is incremented. Consequently, the number of accurate idle intervals for core 701 is available in accuracy logic 830 and the total number of intervals is available in interval tracking logic 830. Therefore, accuracy logic 830 may divide the number of accurate intervals by total intervals to obtain an accuracy value 831, such as an accuracy percentage.

As a result, power manager 715, or accuracy logic 830, may compare this accuracy value to a threshold, such as 90%. If the accuracy exceeds the 90% threshold, then the hardware predicted state of C6 is utilized for core 701. Instead, if the accuracy doesn't exceed the 90% threshold, then the requested power state is utilized for core 701. Note that accuracy logic may be easily inverted in another example, where a counter in accuracy logic 830 is incremented on inaccurate idle intervals and divided by the total number of intervals to obtain an inaccuracy value. This value may then be compared to an inaccuracy threshold, such as 10%. In operation, the uses are essentially the same. Note that accuracy thresholds, as well as the rest of the numbers and states, provided in the example referencing FIG. 8 are purely illustrative. Additionally, thresholds, such as a break even threshold or accuracy threshold may be dynamically adjustable by hardware, privileged software, user software, or a combination thereof.

Figure 9B:
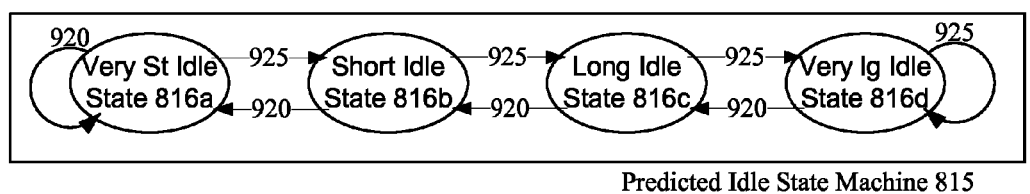
FIG. 9*b* illustrates an embodiment of a state machine for a predicted idle state machine of FIG. 8.

Turning to FIGS. 9a-9b an embodiment of a method for predicting idle duration and determining the accuracy of such prediction is illustrated. In flow 901, a core, wakes up from/exits an idle or non-active state. Note that the core may be part of a group of cores or an entire processor waking up. During the idle, the idle duration is measured/determined in flow 905. For example, a counter counts the duration of the idle.

In flow 910, a total idle count is determined. As an example, upon each idle interval the total idle count is incremented. In flow 915, it's determined if the idle duration is greater than a break even threshold, such as a break even time of a power state. If the idle duration is not greater than the break even threshold, then it's determined that the idle duration was short in flow 920. Similarly, if the idle duration is greater than the break even threshold, then it's determined that the idle duration was long in flow 925. Quickly referencing FIG. 9b again, a state machine is illustrated that moves between states based on the determination in flows 920, 925. For example, if the idle duration is long, as in flow 925, the state machine moves through states 816a-816d towards longer idle states. And inversely, a short duration determination 920 moves the states towards shorter idle states, such as towards state 816a.

Furthermore, in flows 930-945, a prediction accuracy of the prediction hardware is determined. Here, if the idle duration is determined short in flow 920, then there are two possible accuracy outcomes from flow 930: (1) the previously predicted idle state was correct—the predicted idle duration was either states 816a or 816b, which represent short idle durations; or (2) the previously predicted idle state was incorrect—the predicted idle duration was either states 816c or 816d, which represent long idle durations. Similarly, in flow 935 there are two similar outcomes: (1) the previously predicted idle state was correct—the predicted idle duration was either states 816c or 816d, which represent long idle durations; or (2) the previously predicted idle state was incorrect—the predicted idle duration was either states 816a or 816b, which represent short idle durations. As a result, when the prediction from either path is correct, the accuracy count is incremented in flow 940. If the prediction was incorrect, then the flow moves to flow 945, which determines an accuracy value by dividing the accuracy count by the total idle count from flow 910. Therefore, if the accuracy is above a threshold accuracy then the hardware predicted power state is used for core 701. And in contrast, if the accuracy is not above the threshold accuracy then the requested power state is used for core 701. The combination of the software requests and accurate hardware prediction potentially result in highly accurate power state selection, such as the plus 94% correct selection as simulated.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a plurality of N processor cores;
   a prediction mechanism to determine predicted future activity of the plurality of processor cores for a future interval, wherein the predicted future activity is based at least on a first residency of a first aggregate idle-activity pattern for the future interval from a subset of $2^N$ idle-activity patterns for the future interval; and
   a core hopping mechanism to determine if the predicted residency of the aggregate idle-activity pattern for the plurality of cores for the future interval is greater than a residency threshold and, responsive to a core hop request, perform the core hop in response to determining the predicted residency of the aggregate idle-activity pattern for the future interval is greater than the residency threshold and not perform the core hop in response to determining the predicted residency of the aggregate idle-activity pattern for the future interval is not greater than the residency threshold.

2. The apparatus of claim 1, wherein the predicted future activity is further based on a thermal density associated with the plurality of cores.

3. The apparatus of claim 2, wherein the first aggregate idle-activity idle pattern is an aggregate of a number of efficient, core-hopping idle-activity patterns.

4. The apparatus of claim 1, further comprising core hopping trigger logic to generate the core hop event based on at least a thermal density condition, wherein the core hop event includes a request to perform a core hop, and wherein the core hopping mechanism to disallow the core hop event comprises the core hopping mechanism to deny the request to perform the core hop.

5. The apparatus of claim 1, wherein the plurality of cores, the prediction mechanism, and the core hopping mechanism are included within a microprocessor, the microprocessor to be coupled to a memory, wherein the memory is to be selected from a group consisting of a Dynamic Random Access Memory (DRAM), Double Data Rate (DDR) RAM, and a Static Random Access Memory (SRAM).

6. An apparatus comprising:
   a processor including,
   a plurality of N cores;
   core hopping logic coupled to the plurality of cores to trigger a core hop request;
   prediction logic coupled to the plurality of cores to predict an activity of the plurality of cores for a next interval, wherein the activity of the plurality of cores includes a predicted residency of an aggregate idle-activity pattern during the next interval from a subset of $2^N$ idle-activity patterns for the next interval;
   core hop manager logic coupled to the core hopping logic and the prediction logic, the core hop manager logic to determine if the predicted residency of the aggregate idle-activity pattern for the plurality of cores for the next interval is greater than a residency threshold and, responsive to the core hop request, initiate the core hop in response to determining the predicted residency of the aggregate idle-activity pattern for the next interval is greater than the residency threshold and to deny the core hop in response to determining the predicted residency of the aggregate idle-activity pattern for the next interval is not greater than the residency threshold.

7. The apparatus of claim 6, wherein the core hopping logic to trigger the core hop request is based on a thermal density condition.

8. The apparatus of claim 6, wherein the plurality of cores, the core hopping logic, the prediction logic, and the core hop manager logic are included within a microprocessor, the microprocessor to be coupled to a memory, wherein the memory is to be selected from a group consisting of a Dynamic Random Access Memory (DRAM), Double Data Rate (DDR) RAM, and a Static Random Access Memory (SRAM).

9. A method comprising:
   predicting a residency of an aggregate idle-activity pattern for a plurality of N cores on a processor for a future interval from a subset of $2^N$ idle-activity patterns for the future interval;
   receiving a core hop request;
   determining if the predicted residency of the aggregate idle-activity pattern for the plurality of cores for the future interval is greater than a residency threshold;
   performing, responsive to the core hop request, a core hop in response to determining the predicted residency of the aggregate idle-activity pattern for the future interval is greater than the residency threshold; and
   not performing, responsive to the core hop request, the core hop in response to determining the predicted residency of the aggregate idle-activity pattern for the future interval is not greater than the residency threshold.

10. The method of claim 9, wherein the aggregate idle-activity pattern includes a first aggregate of a first number of idle-activity patterns of a total number of possible idle-activity patterns, wherein the first number of idle-activity patterns are determined to be efficient for core hopping.

11. The method of claim 9, further comprising generating the core hop request in response to a thermal density condition.

12. The method of claim 9, wherein the residency threshold is dynamically adjustable by a privileged entity.

13. A non-transitory computer readable medium including program code, which when executed by a machine, is to perform the operations of:
   predicting a residency of an aggregate idle-activity pattern for a plurality of N cores on a processor for a future interval from a subset of $2^N$ idle-activity patterns for the future interval;
   receiving a core hop request;
   determining if the predicted residency of the aggregate idle-activity pattern for the plurality of cores for the future interval is greater than a residency threshold;
   performing, responsive to the core hop request, a core hop in response to determining the predicted residency of the aggregate idle-activity pattern for the future interval is greater than the residency threshold; and
   not performing, responsive to the core hop request, the core hop in response to determining the predicted residency of the aggregate idle-activity pattern for the future interval is not greater than the residency threshold.

* * * * *